United States Patent
Green et al.

(10) Patent No.: US 7,328,738 B2
(45) Date of Patent: Feb. 12, 2008

(54) HEAT EXCHANGER

(75) Inventors: Martin C. Green, Boxborough, MA (US); William L. Sifleet, Acton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/446,645

(22) Filed: May 28, 2003

(65) Prior Publication Data

US 2004/0081609 A1    Apr. 29, 2004

Related U.S. Application Data

(62) Division of application No. 08/627,880, filed on Apr. 3, 1996, now Pat. No. 6,585,949.

(51) Int. Cl.
*F28D 7/00* (2006.01)
*F28F 9/22* (2006.01)

(52) U.S. Cl. .................. 165/11.1; 423/449.2; 165/159; 165/160; 165/161

(58) Field of Classification Search .............. 165/11.1, 165/158, 159, 160, 161, DIG. 402; 423/449.1, 423/449.2
See application file for complete search history.

(56) References Cited

U.S. PATENT DOCUMENTS

| | | | | |
|---|---|---|---|---|
| 1,669,291 | A | * | 5/1928 | Dean ........................... 165/161 |
| 1,794,336 | A | * | 2/1931 | Jacocks ....................... 165/161 |
| 2,075,511 | A | * | 3/1937 | De Baufre ................... 165/140 |
| 2,411,097 | A | * | 11/1946 | Kopp .......................... 165/161 |
| 2,655,350 | A | * | 10/1953 | Gaylord, Jr. ................ 165/160 |
| 2,785,984 | A |  | 3/1957 | Pollock |
| 3,041,150 | A | * | 6/1962 | Worn .......................... 422/148 |
| 3,326,280 | A | * | 6/1967 | Grenier et al. .............. 165/161 |
| 3,401,020 | A |  | 9/1968 | Kester et al. |
| 3,481,151 | A | * | 12/1969 | Seeley ........................ 62/196.4 |
| 3,532,160 | A | * | 10/1970 | Garrison ............ 165/DIG. 402 |
| 3,566,961 | A | * | 3/1971 | Lorenz et al. .............. 165/160 |
| 3,805,890 | A | * | 4/1974 | Boardman et al. .. 165/DIG. 402 |
| 3,827,484 | A | * | 8/1974 | Wolowodiuk ................ 165/161 |
| 3,830,292 | A | * | 8/1974 | Wolowodiuk et al. ....... 165/161 |
| 3,907,029 | A | * | 9/1975 | Klein et al. ................. 165/161 |
| 3,922,335 | A |  | 11/1975 | Jordan et al. |
| 3,965,975 | A | * | 6/1976 | Edmundson ................ 165/108 |
| RE28,974 | E |  | 9/1976 | Morgan et al. |

(Continued)

FOREIGN PATENT DOCUMENTS

DE         1293521         4/1969

(Continued)

OTHER PUBLICATIONS

PCT/US97/05267 International Search Report Mailed Jul. 15, 1997.

*Primary Examiner*—Ljiljana Ciric

(57) ABSTRACT

An improved heat exchanger which resists fouling of the heat exchange surface by minimizing the temperature difference between the heat exchanger surface and the fluid stream in contact with the heat exchange surface. In one embodiment, a heat exchanger comprises an outer shell, the outer shell comprising a first inlet operable to pass a first fluid stream, an inner shell at least partially disposed within the outer shell, the inner shell comprising a second inlet and an outlet operable to pass the first fluid stream, and a heat exchange surface comprising a plurality of tubes operable to pass a second fluid stream.

15 Claims, 4 Drawing Sheets

U.S. PATENT DOCUMENTS

| | | | |
|---|---|---|---|
| 4,084,546 A * | 4/1978 | Schneeberger et al. | 165/140 |
| 4,224,981 A * | 9/1980 | Datz et al. | 165/160 |
| 4,370,309 A | 1/1983 | Cheng | |
| 4,538,674 A * | 9/1985 | Schluderberg | 165/141 |
| 4,558,734 A | 12/1985 | Wolfseder | |
| 4,560,334 A * | 12/1985 | Rutledge | 165/141 |
| 4,635,712 A * | 1/1987 | Baker et al. | 165/82 |
| 4,645,001 A * | 2/1987 | Hillerstrom | 165/DIG. 402 |
| 5,001,906 A * | 3/1991 | Engdahl et al. | 165/159 |
| 5,203,405 A * | 4/1993 | Gentry et al. | 165/160 |
| 5,261,485 A * | 11/1993 | Thornton et al. | 165/158 |
| 5,866,083 A * | 2/1999 | Berglund et al. | 165/160 |
| 6,276,442 B1 * | 8/2001 | Rasmussen | 165/140 |
| 6,334,483 B1 * | 1/2002 | Berglund et al. | 165/135 |
| 6,827,138 B1 * | 12/2004 | Master et al. | 165/159 |

FOREIGN PATENT DOCUMENTS

| | | |
|---|---|---|
| EP | 0086162 | 8/1983 |
| FR | 2088823 | 9/1971 |
| GB | 1596815 | 8/1981 |

\* cited by examiner

HEAT EXCHANGER

STATEMENT OF RELATED APPLICATIONS

The present application is a divisional application under 35 USC §120 of U.S. patent application Ser. No. 08/627,880, filed Apr. 3, 1996 now U.S. Pat. No. 6,585,949.

FIELD OF THE INVENTION

The present invention relates to an improved heat exchanger. The heat exchanger of the present invention is advantageous for use in a carbon black production process.

BACKGROUND

Carbon blacks are generally produced in a furnace-type reactor by pyrolyzing a hydrocarbon feedstock with hot combustion gases to produce combustion products containing particulate carbon black. A variety of methods for producing carbon blacks are generally known.

In one type of a furnace carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences. In this instance, pyrolysis refers to the thermal decomposition of a hydrocarbon. The resulting combustion gas mixture, in which pyrolysis is occurring, then passes into a reaction zone where completion of the carbon black forming reaction occurs.

In another type of a furnace carbon black reactor a liquid or gaseous fuel is reacted with an oxidant, preferably air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. The hydrocarbonaceous feedstock may be liquid, gas or vapor, and may be the same or different than the fuel utilized to form the combustion gas stream. Generally the hydrocarbonaceous feedstock is a hydrocarbon oil or natural gas, however other hydrocarbonaceous feedstocks such as acetylene are known in the art. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. Furnace carbon black reactors of this type are generally described in U.S. Pat. Reissue No. 28,974 and U.S. Pat. No. 3,922,335 the disclosure of each being incorporated herein by reference.

In generally known reactors and processes, the hot combustion gases are at a temperature sufficient to effect pyrolysis of the hydrocarbonaceous feedstock injected into the combustion gas stream. In one type of reactor, such as disclosed in Kester, feedstock is injected, at one or more points, into the same zone where combustion gases are being formed. In other type reactors or processes the injection of the feedstock occurs, at one or more points, after the combustion gas stream has been formed. In either type of reactor, since the hot combustion gas stream is continuously flowing downstream through the reactor, pyrolysis continuously occurs as the mixture of feedstock and combustion gases passes through the reaction zone. After carbon blacks having the desired properties are formed, the temperature of the effluent is lowered to a temperature such that pyrolysis is stopped, thereby halting the further production of carbon blacks.

After pyrolysis is stopped, the carbon black containing stream generally passes through a heat exchanger to further cool the mixture.

A disadvantage with many heat exchangers utilized in carbon black production processes is that the combustion air heat exchangers operate in a fouled condition. Fouling occurs through a build-up of carbon black and other deposits on the heat exchange surface, in particular the internal heat exchange surface which comes in contact with the carbon black containing stream.

The fouling of heat exchanger surfaces in a carbon black processes is often cyclical in nature. A period of gradual fouling can be followed by a faster defouling, followed by another period of fouling etc. The fouling of heat exchanger surfaces in a carbon black production process can lead to a number of problems including:

less effective heat transfer resulting in lower air exiting temperatures (lower air preheat) and thus lower carbon black yields and production rates;

less effective heat transfer necessitating higher carbon black stream entering temperatures in order to achieve a desired air exiting temperature, thus increasing the stresses imposed on the heat exchanger materials;

less effective heat transfer resulting in variations in air exiting temperatures which result in variations in carbon black morphology.

an increase in heat exchanger pressure drop, which can result in lower production rates and greater stresses in the heat exchanger materials;

possible equipment damage;

and the tendency of the deposits to harden over time while on the heat exchange surface resulting in the possibility that the hardened deposits will re-enter the carbon black stream contaminating the carbon black product.

SUMMARY OF THE INVENTION

We have discovered that the fouling of a heat exchange surface in a heat exchanger may be reduced or minimized by maintaining a temperature difference between the heat exchange surface and a fluid stream in contact with the heat exchange surface. For example, fouling of the heat exchange surfaces in a combustion air heat exchanger may be reduced or minimized by maintaining the temperature difference between the heat exchange surface and the carbon black stream in contact with the heat exchange surface such that the temperature difference is sufficient to inhibit fouling of the heat exchange surface. In the case of a combustion air heat exchanger, the temperature difference between the heat exchange surface and the carbon black stream is preferably not greater than 500° F., more preferably not greater than 300° F. and even more preferably not greater than 100° F. Preferably the temperature difference is maintained throughout the heat exchanger. Depending on the carbon black production process, it is possible that at a particular temperature difference, fouling of the heat exchange surface may be substantially eliminated.

According to the present invention, a method for reducing the fouling of a heat exchange surface of a heat exchanger for transferring heat between a first fluid stream and a second fluid stream each passing through the heat exchanger and in communication with the heat exchange surface, comprises maintaining the temperature difference between the heat exchange surface and a fluid stream so that the temperature difference is sufficient to inhibit fouling of the heat exchange surface. The temperature difference may be maintained by controlling the velocity of one of the fluid streams. With reference to a combustion air heat exchanger of the type utilized in a carbon black production process, the present invention provides a method for reducing the fouling of a heat exchange surface of a heat exchanger for tranferring heat between a carbon black stream and an air stream each passing through the heat exchanger and in communication with the heat exchange surface, the method comprising: maintaining the temperature difference between the heat exchange surface and the carbon black stream so that the temperature difference is sufficient to inhibit fouling of the heat exchange surface. The temperature difference may be maintained by controlling the velocity of the air stream. As used in the foregoing description, "communication" refers to the ability to transfer heat between the stream and the heat exchange surface.

In accordance with another aspect of the present invention, a heat exchanger for transferring heat between a first and second fluid comprises:
  a heat exchange surface;
  means for passing the first fluid stream past the heat exchange surface;
  means for passing the second fluid stream past the heat exchange surface;
wherein the means for passing the first fluid stream past the heat exchange surface enable a temperature difference to be maintained between the heat exchange surface and the second fluid stream sufficient to inhibit fouling of the heat exchange surface. Preferably the temperature difference maintained between the heat exchange surface and the first fluid is not greater than 500° F., more preferably not greater than 300° F. and even more preferably not greater than 100° F. Preferably the temperature difference is maintained throughout the entire heat exchanger. The passing of the first fluid and second fluid past the heat exchange surface occurs sufficiently proximate to the heat exchange surface to allow heat transfer between each fluid and the heat exchange surface. For example each fluid stream may be in contact with the heat exchange surface.

With reference to a carbon black production process, a heat exchanger for transferring heat between a carbon black stream generated by a carbon black production process and an air stream comprises;
  a heat exchange surface;
  means for passing the carbon black stream past the heat exchange surface;
  means for passing the air stream past the heat exchange surface;
wherein the means for passing the air stream past the heat exchange surface enable a temperature difference to be maintained between the heat exchange surface and and the carbon black stream of not greater than 500° F., more preferably not greater than 300° F. and even more preferably not greater than 100° F. Preferably the temperature difference is maintained throughout the entire heat exchanger. The passing of the carbon black stream and the passing of the air stream past the heat exchange surface occur sufficiently proximate to the heat exchange surface to allow heat transfer between each stream and the heat exchange surface. For example, the carbon black stream and the air stream may each be in contact with the heat exchange surface.

In accordance with another aspect of the present invention there is provided a process for producing carbon blacks comprising:
  forming a stream of hot combustion gases by reacting a preheated air stream with a fuel;
  passing the stream of hot combustion gases through a reactor;
  injecting feedstock into the stream of hot combustion gases at one or more points to form an effluent and start pyrolysis of the feedstock in the effluent;
  cooling the effluent after the formation of carbon blacks to stop pyrolysis and obtain a resultant carbon black stream comprising combustion gases and carbon black;
  passing the carbon black stream past a heat exchange surface to cool the carbon black stream;
  passing an air stream past the heat exchange surface to create the preheated air stream;
  further cooling the carbon black stream in a secondary cooler to a temperature that prevents damage to the means utilized for separating and collecting the carbon black product; and separating and collecting carbon black product, wherein the temperature difference between the heat exchange surface and the carbon black stream is not greater than 500° F., more preferably not greater than 300° F. and even more preferably not greater than 100° F.

An advantage of the method and the heat exchanger of the present invention is that the heat exchange surface is less prone to fouling than conventional heat exchangers.

An advantage of the combustion air heat exchanger of the present invention is that the combustion air heat exchanger resists fouling of the heat exchange surface thereby minimizing the occurrence of the problems described above which beset conventional combustion air heat exchangers.

An advantage of the process for producing carbon blacks of the present invention is that the process produces a high purity carbon black product with substantially consistent morphology.

Further details and advantages of the features of the present invention are set forth in the following more detailed description.

DETAILED DESCRIPTION OF THE INVENTION

Figure 1:
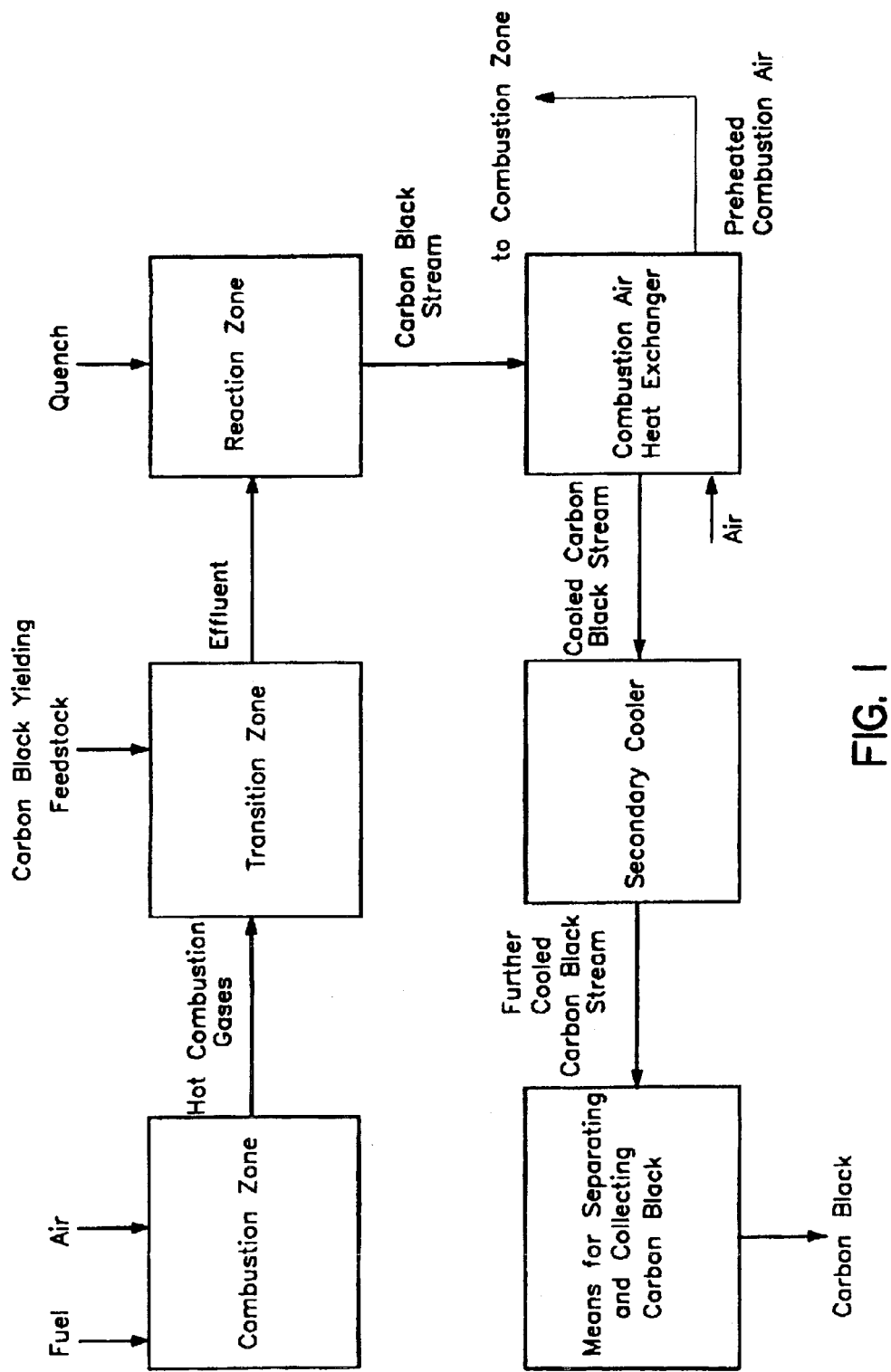
FIG. 1 is a block schematic diagram of a typical carbon black production process.

The present invention provides a method for minimizing fouling of a heat exchange surface in a heat exchanger comprising the heat exchange surface, a first fluid flowing past the heat exchange surface and a second fluid flowing past the heat exchange surface, the method comprising: maintaining a temperature difference between the heat exchange surface and the first fluid sufficient to inhibit fouling of the heat exchange surface, preferably a temperature difference of not greater than 500° F., more preferably not greater than 300° F. and even more preferably not greater than 100° F. The temperature difference is preferably maintained throughout the heat exchanger. The flow of the first and second fluids past the heat exchange surface occurs sufficiently proximate to the heat exchange surface to allow heat transfer between each fluid and the heat exchange surface. The temperature difference between the heat exchange surface and the first fluid may be maintained by controlling the velocity of the second fluid as it passes the heat exchange surface.

With reference to a combustion air heat exchanger of the type utilized in a carbon black production process, the present invention provides a method for reducing the fouling of a heat exchange surface of a heat exchanger for tranferring heat between a carbon black stream and an air stream each passing through the heat exchanger and in communication with the heat exchange surface, the method comprising: maintaining a temperature difference between the heat exchange surface and the carbon black stream sufficient to inhibit fouling of the heat exchange surface. The temperature difference is preferably maintained by controlling the velocity of the air stream passing the heat exchange surface. As used in the foregoing description, "communication" refers to the ability to transfer heat between the stream and the heat exchange surface.

The present invention also provides a heat exchanger for transferring heat between a first and second fluid comprising:
a heat exchange surface;
means for passing the first fluid past the heat exchange surface;
means for passing the second fluid past the heat exchange surface;

wherein the means for passing the first fluid stream past the heat exchange surface enable a temperature difference to be maintained between the heat exchange surface and the second fluid stream sufficient to inhibit fouling of the heat exchange surface. Preferably the temperature difference maintained between the heat exchange surface and the first fluid is not greater than 500° F., more preferably not greater than 300° F. and even more preferably not greater than 100° F. Preferably the temperature difference is maintained throughout the entire heat exchanger. The passing of the first fluid and second fluid past the heat exchange surface occurs sufficiently proximate to the heat exchange surface to allow heat transfer between each fluid and the heat exchange surface. For example each fluid stream may be in contact with the heat exchange surface. The temperature difference between the heat exchange surface and the first fluid may be maintained by controlling the velocity of the second fluid past the heat exchange surface.

With reference to a carbon black production process, a heat exchanger for transferring heat between a carbon black stream generated by a carbon black production process and an air stream comprises;
a heat exchange surface;
means for passing the carbon black stream past the heat exchange surface;
means for passing the air stream past the heat exchange surface;

wherein the means for passing the air stream past the heat exchange surface enable a temperature difference to be maintained between the heat exchange surface and and the carbon black stream of not greater than 500° F., more preferably not greater than 300° F. and even more preferably not greater than 100° F. Preferably the temperature difference is maintained throughout the entire heat exchanger. The passing of the carbon black stream and the passing of the air stream past the heat exchange surface occur sufficiently proximate to the heat exchange surface to allow heat transfer between each stream and the heat exchange surface. For example, the carbon black stream and the air stream may each be in contact with the heat exchange surface.

The method for minimizing the fouling of the heat exchange surface of the present invention, and the heat exchanger of the present invention are described in further detail below with reference to embodiments of a heat exchanger for use in a carbon black production process. It should be noted however, that the following description is not meant to limit the scope of the present invention. The present invention includes other forms of heat exchangers falling within the scope of the claims set forth below.

One embodiment of a carbon black production process is depicted in block schematic form in FIG. 1. As shown in FIG. 1, a fuel and combustion air are reacted in a combustion zone to generate a stream of hot combustion gases. The hot combustion gases travel downstream into a transition zone where a carbon black yielding feedstock is injected into the hot combustion gas stream to pyrolyze the feedstock and generate carbon blacks. The mixture of feedstock and combustion gases in which pyrolysis is occurring is hereinafter referred to, throughout the application, as "the effluent". The residence time of the effluent in the reaction zone of the reactor is sufficient, and under conditions suitable, to allow the formation of carbon blacks.

The resultant mixture of hot combustion gases and feedstock in which carbon black formation is occurring (the effluent) passes into a reaction zone. The temperature of the effluent in the reactor is generally above about 1750° F. (degrees Fahrenheit), often reaching over 3300° F. When the desired carbon blacks are formed, pyrolysis of the carbon black yielding feedstock, is stopped by quenching the mixture. Generally pyrolysis is stopped by a quench injecting a quenching fluid. In conventional processes the quench that stops pyrolysis cools the effluent to below about 1750° F., often to about 1400° F. As utilized herein the mixture comprising: carbon black, carbon black reaction by-products, gases, unreacted feedstock (if any) and evaporated quench water, if a water quench is utilized, is referred to as the "carbon black stream".

After pyrolysis is stopped, the carbon black stream generally passes through a heat exchanger to further cool the mixture. This heat exchanger may be advantageously utilized to preheat the combustion air to be utilized in the process while at the same time cooling the quenched mixture from the reactor. As utilized herein, a heat exchanger utilized to cool a carbon black stream by heat exchange with an air stream to be utilized in the production of the combustion gas stream in a carbon black reactor is referred to as a "combustion air heat exchanger". The air being heated in the combustion air heat exchanger is referred to at the "combustion air".

The carbon black stream travels into the combustion air heat exchanger at the post quenching temperature and is further cooled by the heat exchanger to about 1000° F. An air stream is also supplied, generally counter-currently, to the combustion air heat exchanger and is preheated to a temperature between 900 and 1500° F. The preheated combustion air stream is generally fed back into the combustion zone to react with the fuel and form the hot combustion gas stream. The combustion air is preheated to improve the carbon black yield from each unit of hydrocarbon feedstock and to achieve greater overall carbon black production rates.

The cooled carbon black stream exiting the combustion air heat exchanger is further cooled in a secondary cooler to a temperature of 400-500° F. The further cooled carbon black stream passes into means, such as bag filters, for separating and collecting the carbon blacks.

The combustion air heat exchanger utilized in a carbon black production process may employ the method of the present invention for minimizing the fouling of the heat exchange surface, and may comprise an embodiment of the heat exchanger of the present invention.

A typical combustion air heat exchanger in a carbon black production process comprises a counter-current, shell and tube heat exchanger. There are typically between 40 and 144 tubes in each carbon black heat exchanger, of 3.5 inches outside diameter and 40 foot length. The carbon black stream flows inside the tubes. The air stream (combustion air stream) flows over the outside of the tubes, in a cross-flow manner. The cross-flow is achieved by the use of segmented baffles. The number of baffles in a typical carbon black heat exchanger, is between 10 and 40. As utilized herein the area available for the flow of the air stream between any two baffles of a shell and tube heat exchanger, is referred to as a "baffle pass".

Other types of heat exchanger can be used as combustion air heat exchangers in embodiments of the present invention. For example, counter-current and co-current double pipe heat exchangers can be used. The carbon black stream can flow inside or outside the inner tube. Each reactor can utilize one or more heat exchangers, arranged in parallel and/or series.

Figure 2:
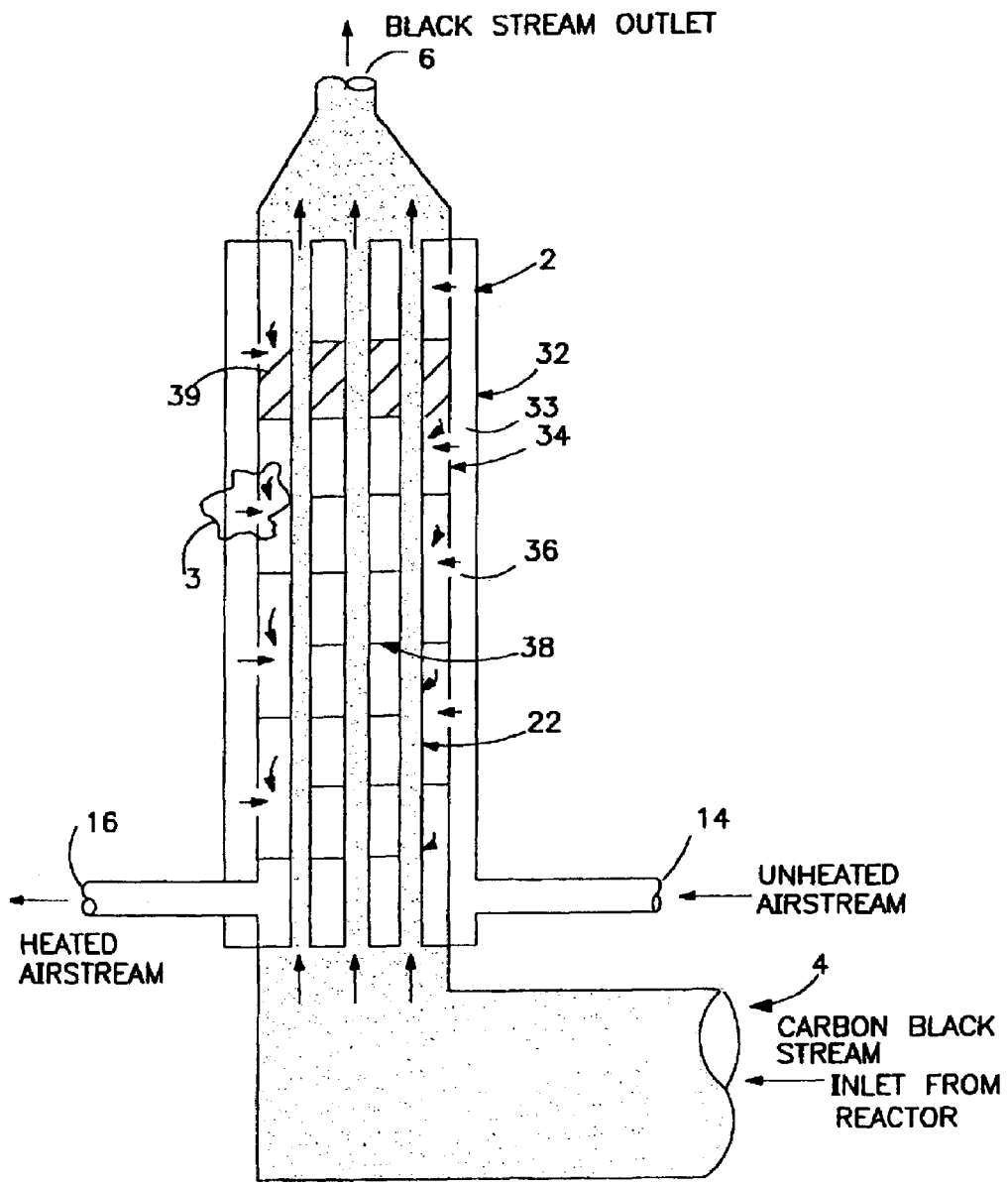
FIG. 2 depicts an embodiment of a heat exchanger of the present invention.

An embodiment of a combustion air heat exchanger according to the present invention is depicted in FIG. 2. Referring to FIG. 2, a combustion air heat exchanger of the present invention, 2 may comprise an inlet 4, for a carbon black stream from a reactor and an outlet 6, for the cooled carbon black stream. Inlet 14 and outlet 16 are provided for the combustion air stream being heated.

Tubes 22 are provided inside the combustion air heat exchanger for carrying carbon black stream through the heat exchanger. The tubes comprise the heat exchange surface of the combustion air heat exchanger for exchanging heat between the carbon black stream and the combustion air stream.

The combustion air heat exchanger may include any number of tubes, of any diameter and length. For example, the combustion air heat exchanger include may include 15-250 tubes for certain applications and 40-144 tubes for other applications. While the tubes may be of any dimension, the tubes are generally 1.5 to 7.95 inches in inner diameter, and 2-8 inches in outer diameter and 20-50 feet in length. For example, the tubes may have an outer diameter of 3.5 inches and be 40 feet in length. The actual number and dimension of the tubes will depend on the flow rate desired through the heat exchanger as well as the desired amount of cooling of the carbon black stream and heating of the combustion air stream. Generally the number of tubes and their dimensions will be optimized to achieve the combustion air rate and preheat desired for the carbon black production process and/or to permit economic constuction of the heat exchanger.

The combustion air heat exchanger is provided with an outer shell 32 and an inner shell 34. The space in between the inner and outer shell, comprises a plenum, 33, for distributing the air stream between the various baffle passes. The cross sectional area is preferably large, e.g. greater than 50%, compared with the cross sectional area available for the air stream flow in the other parts of the heat exchanger, to ensure good air distribution. Holes may be made in the inner shell to feed the air stream to the desired baffle passes. The overall cross sectional area of the holes is preferably small, e.g. less than 50%, compared to the cross sectional area of the plenum and the other areas available for the air stream to flow in other regions of the heat exchanger.

This preferred design is illustrated in FIG. 2. The combustion air stream enters the heat exchanger through inlet 14 and travels throughout the outer shell passages. Airstream feed ports 36 allow the combustion air stream to pass into the interior regions of the inner shell and contact the carbon black stream containing tubes 22. Region 3, comprising an airstream feed port is shown in more detail in FIG. 3a.

The air stream flows over the outside of the tubes, in a cross-flow manner. The cross-flow is achieved by the use of segmented baffles 38. The combustion air heat exchanger may include any number of baffles. For example the combustion air heat exchanger may include 5 to 50 baffles for certain applications and 15 to 30 baffles for other applications. The area available for the flow of the air stream between any two baffles is referred herein to as a baffle pass. An example of a baffle pass is shown as region 39 in FIG. 2.

A combustion air heat exchanger of the present invention may be constructed from any material capable of withstanding the operating temperatures of the heat exchanger and the stresses imposed at the operating temperatures. By way of example, the carbon black stream containing tubes and portions of the heat exchanger may be constructed from stainless steel, such as 309 Stainless Steel, or 304 Stainless Steel. The inner and outer shell portions, and the baffles may be constructed from the same or a different material, for example 304 Stainless Steel or Carbon Steel. The choice of suitable materials is believed to be within the skill of one of ordinary skill in the art.

According to the present invention, the heat exchanger is designed such that the temperature difference between the carbon black stream and the heat exchange surface inhibits fouling of the heat exchange surface. Preferably the temperature difference does not exceed 500° F., more preferably 300° F., even more preferably 100° F. at any point in the heat exchanger. The temperature difference may be determined by known techniques, such as by calculation or thermocouple.

The temperature difference between the carbon black stream and the heat exchange surface may be effectively controlled at any point in the heat exchanger, by controlling the velocity of the combustion air stream at that point. The velocity of the combustion air stream should be sufficient to maintain the desired temperature difference between the carbon black stream and heat exchange surface at any point in the heat exchanger. Increasing the velocity of the combustion air stream will generally increase the temperature difference whereas decreasing the velocity of the combustion air stream will decrease the temperature difference. The air stream velocity may be effectively controlled by dividing the air stream and feeding the air stream to different baffle passes. Preferably the air stream is fed into a minimum of 25% of the heat exchanger baffle passes and at least three baffle passes. In situations of the greatest fouling tendency, it is preferred to feed the air stream between a minimum of 75% of the heat exchanger baffle passes.

The dividing of the air stream into parts, and the feeding of the air stream to different baffle passes may be accomplished utilizing the outer and inner shell, and air port arrangement depicted in FIG. 2. The combustion air will travel within the space between the inner and outer shells until it enters the inner baffled regions through the air ports.

Figure 3A:
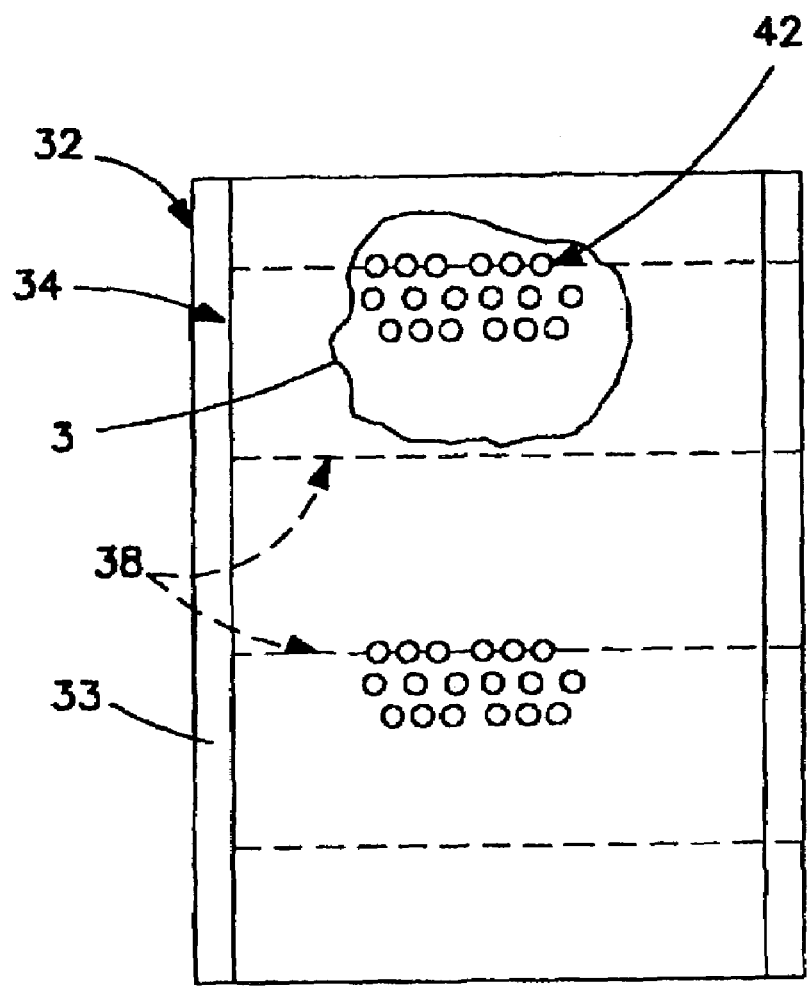
FIGS. 3a, 3b and 3c depict a portion of the embodiment of the heat exchanger of the present invention depicted in FIG. 2 in greater detail.

FIG. 3a depicts a region between the inner shell 34 and the outer shell 32 of heat exchanger 2 in more detail. As shown in FIG. 3a, air ports 36 may comprise a plurality of holes 42, drilled in the inner shell, 34 of the heat exchanger. The number of holes, and their diameter, may be varied to control the air flow into the inner baffled region. The design of the heat exchanger is preferably refined to minimize the possibility of local cooling of any part of the heat exchange surface. In this case the maximum hole size used to introduce the air stream to a baffle pass, is limited to at least one inch diameter and preferably one half inch diameter. The amount of air added to each baffle pass is controlled by the number of holes used. The holes are spaced as far apart as much as practical. However, preferably the holes are located in the "high velocity region", 44 formed by the air stream flowing through each baffle segment. This refinement is illustrated in FIG. 3b, wherein the periphery of the high velocity region, 39 is also shown. The extent of the "high velocity region" is also defined in FIG. 3b.

The baffle pass locations at which the air stream is fed into the inner tube-containing regions of the heat exchanger are selected to maintain the desired temperature difference between the carbon black stream and the heat exchange surface (tubes). The size and number of holes may be calculated utilizing known techniques so that the amount of air introduced, and the velocity of the air stream, are sufficient to maintain the desired temperature difference between the carbon black stream and the heat exchange surface.

FIG. 3b provides another view of the region depicted in FIG. 3a showing the inner portions of the heat exchanger. As shown in FIG. 3b the combustion air stream generally travels from upper to lower baffle passes throughout the heat exchanger as shown by path 50.

Figure 3C:
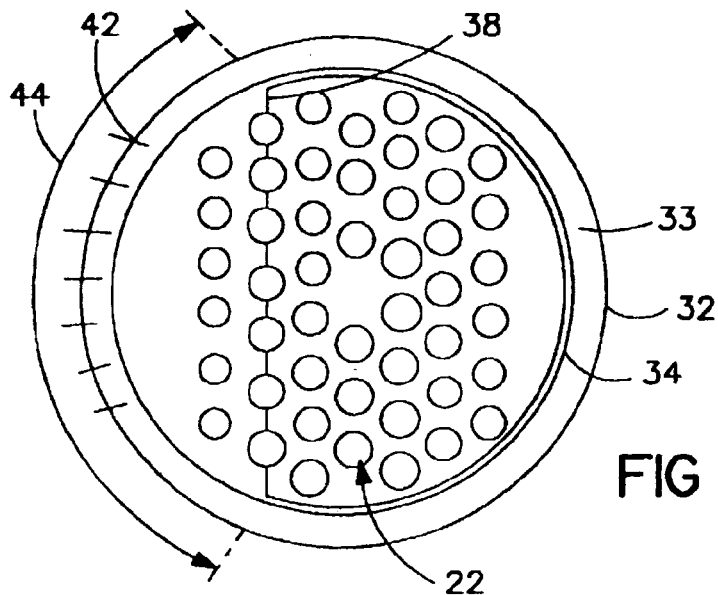
Figure 3B:
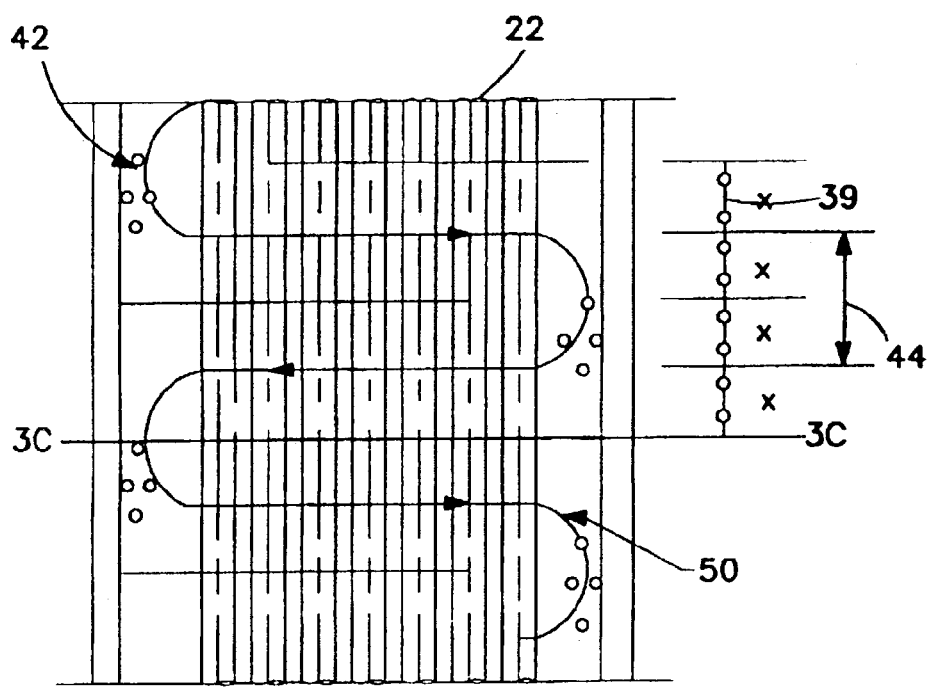

FIG. 3c depicts a possible cross sectional view of a heat exchanger of the present invention, for example along the A-A' line in FIGS. 3a and 3b. As shown in FIG. 3c, the outer shell may may completely surround the inner shell. In an alternate embodiment, the outer shell may overlay a portion of the inner shell to create the region between the inner shell and outer shell.

As explained above, the embodiment of the heat exchanger of the present invention depicted in FIGS. 2, 3a, 3b and 3c may operate in the following manner. A hot carbon black stream, generally at a temperature of 1400-1750° F., enters the heat exchanger through inlet 4. The carbon black stream travels up through tubes 22 and exits the heat exchanger through outlet 6. A combustion air stream enters the region between the inner and outer shells through inlet 14, generally at a temperature of 150° F. The combustion air stream travels throughout the region between the inner and outer shells and enters baffle pass regions in the interior of the inner shells through air ports 36.

In the interior of the inner shell, the combustion air stream passes around tubes 22 and heat is exchanged between the surface of the tubes and the combustion air stream. The heated combustion air stream exits the interior of the inner shell through outlet 16.

Generally, the heat exchange occurring in the heat exchanger lowers the temperature of the carbon black stream to 700-1400° F., and raises the temperature of the combustion air stream to 900-1500° F.

According to the present invention the air stream velocity at the point of contact with the heat exchange surface (the tubes) may also be controlled by the design of the baffle spacing within the heat exchanger. For the baffle passes where the unpreheated airstream is being introduced, the baffle passes are preferably large. In such locations it may be beneficial to remove the baffles altogether. For the baffle passes near the air stream outlet, the baffle spacing will preferably be less, to maximize heat exchange within pressure drop and temperature difference constraints.

A carbon black production process of the present invention comprises a carbon black production process utilizing a combustion air heat exchanger of the present invention.

The features and advantages of the present invention will be further explained by the following non-limiting examples.

EXAMPLE

This example illustrates an embodiment heat exchanger of the present invention suitable for use as a combustion air heat exchanger in a carbon black production process and the advantages acheived by its use.

The features of the present invention were demonstrated on a carbon black unit with one reactor and one shell and tube heat exchanger (combustion air heat exchanger). Prior to use of a combustion air heat exchanger of the present invention, the unit had a conventional, counter-current, shell and tube heat exchange. It contained 40 tubes of 3.5 inches outside diameter, 50 feet in length and contained 33 baffles i.e. 34 baffle passes. The black stream was on the tubeside and the air stream was on the shellside. It was installed vertically so the black stream enters from the bottom. This heat exchanger normally fouled to a large extent, as shown by the large tubeside pressure drop. When the unit was periodically shutdown, it was observed that up to 35% of the tubes were completely plugged with carbon black.

The heat exchanger on this unit was subsequently replaced by a heat exchanger of the present invention, i.e. a heat exchanger modified in accordance with the new concepts described herein. Prior to modification, this second heat exchanger was identical to the previous heat exchanger, except it contained 48 tubes. The change in the number of tubes is not believed to have a significant affect on fouling. The second heat exchanger was modified as follows:

1) The airstream being fed to the conventional air inlet and first baffle pass, was restricted to 5% of the total air stream flow.

2) The remainder of the air stream was equally distributed between the third and the seventeenth baffle passes from the air inlet, through holes drilled in the inner shell. A new outer shell was installed around these baffles passes to form a plenum for this air stream.

3) The first baffle was removed to enlarge the first baffle pass thereby reducing the number of baffle passes to 33.

The table below compares the performance of the two heat exchangers, while making a carbon black grade with an Iodine No. of 68 $m^2/gm$ and a DBP absorption value of 46 cc/100 gm on a 30 gm sample. These were the properties of the black at the heat exchanger, prior to any pelletization. The $I_2$ No. (iodine adsorption number) of the carbon blacks was determined according to ASTM D1510. The DBP (dibutyl phthalate adsorption value) of the carbon black was determined according to the procedure set forth in ASTM D2414.

| Heat Exchanger Type | Conventional | Present Invention |
| --- | --- | --- |
| Air Stream Rate (lb/hr) | 17200 | 17400 |
| Carbon Black Stream Rate (lb/hr) | 28700 | 31080 |
| Carbon Black Stream Inlet Temp (° F.) | 1428 | 1133 |
| Air Stream Outlet Temp (° F.) | 955 | 947 |

-continued

| Heat Exchanger Type | Conventional | Present Invention |
|---|---|---|
| Overall heat transfer coefficient (Btu/hrft$^2$ ° F.) | 2.8 | 4.3 |
| Tubeside Pressure Drop (psi) | 1.5 | 0.2 |

The heat exchanger of the present invention demonstrated superior performance in comparison to the previously installed heat exchanger. The results set forth above indicate that the pressure drop across the tubes was lower and the heat exchanger overall heat transfer coefficent was higher in the heat exchanger of the present invention. It was also observed that the air stream preheat was more stable while utilizing the heat exchanger of the present invention.

It should be clearly understood that the forms of the present invention herein described are illustrative only and are not intended to limit the scope of the invention.

The invention claimed is:

1. An apparatus for producing carbon black comprising:
   a combustion zone;
   a transition zone;
   a reaction zone;
   a heat exchanger; and
   a secondary cooler, wherein the heat exchanger comprises:
      an outer shell, the outer shell comprising a first inlet operable to pass an air stream;
      an inner shell at least partially disposed within the outer shell, the inner shell comprising a second inlet and an outlet operable to pass the air stream;
      a plurality of baffles disposed within the inner shell; and
      a heat exchange surface at least partially disposed within the inner shell, the heat exchange surface comprising a plurality of tubes operable to pass a carbon black stream.

2. The apparatus of claim 1, wherein the second inlet of the heat exchanger comprises a plurality of holes.

3. The apparatus of claim 1, wherein the plurality of tubes of the heat exchanger comprises 15 to 250 tubes.

4. The apparatus of claim 1, wherein the plurality of tubes of the heat exchanger comprises 40 to 144 tubes.

5. The apparatus of claim 1, wherein the plurality of baffles of the heat exchanger comprises 5 to 50 baffles.

6. The apparatus of claim 1, wherein the plurality of baffles of the heat exchanger comprises 15 to 30 baffles.

7. The apparatus of claim 1, wherein the plurality of baffles of the heat exchanger defines at least one baffle pass, the at least one baffle pass comprising an area between any two baffles.

8. The apparatus of claim 1, wherein the at least one baffle pass comprises a plurality of baffle passes.

9. The apparatus of claim 8, wherein the air stream is fed into at least 25% of the baffle passes.

10. The apparatus of claim 8, wherein the air stream is fed into at least 75 percent of the baffle passes.

11. The apparatus of claim 1, wherein the heat exchanger is operable to maintain a temperature difference between the heat exchange surface and the second fluid stream sufficient to inhibit fouling of the heat exchange surface.

12. The apparatus of claim 11, wherein the temperature difference is not greater than 500° F.

13. The apparatus of claim 11, wherein the temperature difference is not greater than 300° F.

14. The apparatus of claim 11, wherein the temperature difference is not greater than 100° F.

15. The apparatus of claim 1,
   wherein the air stream passes over the heat exchange surface in a substantially transverse direction.

* * * * *